Figure 1:
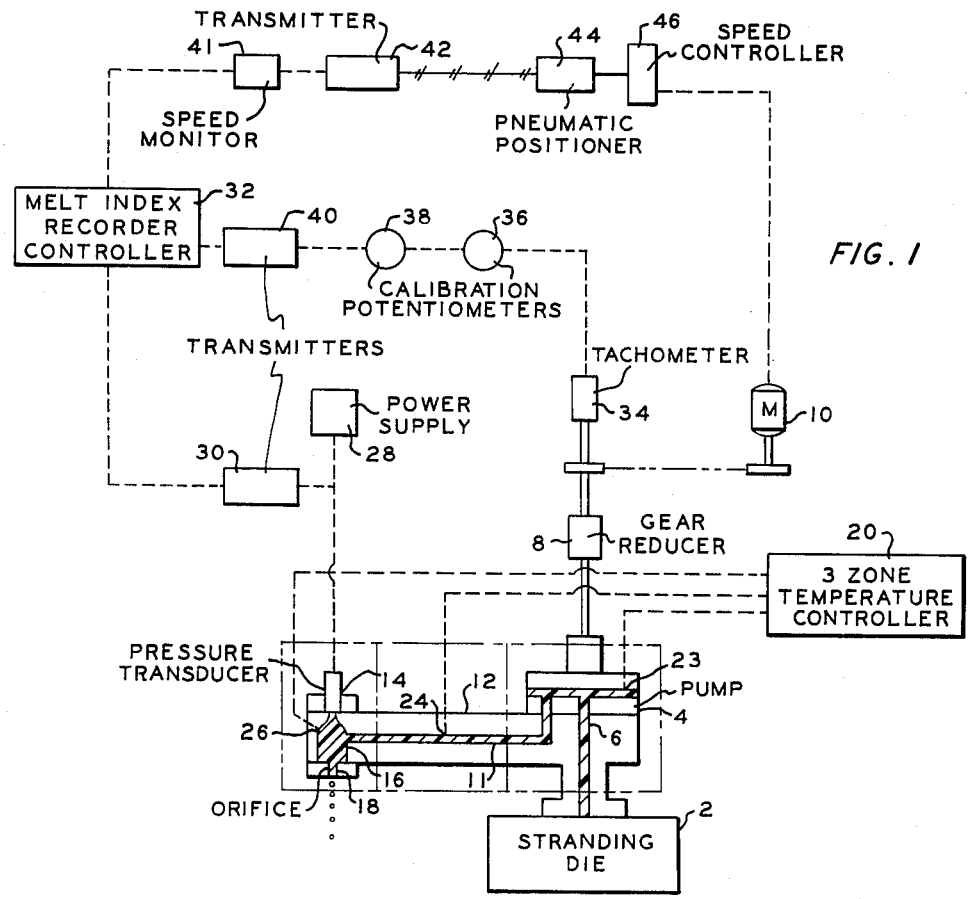

May 24, 1966 R. O. WELTY 3,252,320
MELT INDEX APPARATUS
Filed Dec. 2, 1963 2 Sheets-Sheet 1

INVENTOR.
R. O. WELTY
BY Young and Grigg
ATTORNEYS

May 24, 1966  R. O. WELTY  3,252,320
MELT INDEX APPARATUS
Filed Dec. 2, 1963  2 Sheets-Sheet 2

INVENTOR.
R. O. WELTY
BY
ATTORNEYS

United States Patent Office 3,252,320
Patented May 24, 1966

3,252,320
MELT INDEX APPARATUS
Richard O. Welty, Bartlesville, Okla., assignor to Phillips Petroleum Company, a corporation of Delaware
Filed Dec. 2, 1963, Ser. No. 327,202
8 Claims. (Cl. 73—56)

This invention relates to apparatus for determining the melt index of polymeric materials. In one aspect the invention relates to apparatus for continuously measuring a property which is a function of melt index. In another aspect the invention relates to apparatus for continuously measuring a property which is a function of melt index calibrated to provide a direct visual reading of melt index.

In the preparation of fluids and semi-solids, such as normally solid polymers of 1-olefins, certain rheological properties are frequently utilized for control purposes. One of these rheological properties more usually employed is melt index or melt flow which characterizes the processability of the polymers and is also an indication of polymer molecular weight. The melt index of polyethylene is measured normally according to the ASTM test D–1238–57T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing 2160 grams. The melt flow of polypropylene is determined by the same procedure except at a temperature of 230° C. according to ASTM D–1238–57T condition L (from 1962 ASTM preprint). The apparatus utilized for determining melt index is defined in ASTM manual as a "dead-weight piston plastometer." As used in the following discussion the term melt index includes melt flow and defines the polymer property determined according to the procedure set forth in ASTM D–1238–57T and from the 1962 ASTM preprint at the temperature and pressure appropriate to the polymer.

The employment of these standard plastometers to check and control a polymerization process or polymer finishing operations requires the presence of a lab technician to conduct these tests. Due to variations in measurement technique by a specific operator from day to day, the errors in measurement due to the human element compound the errors inherent in the ASTM apparatus and result in melt index values with wide variation even on identical samples. This lack of confidence in reproducibility of melt index values along with the required presence of a technician to conduct the test limits the amount of data that can be collected and relied upon so that a production facility can determine its operating variables and the effects of change in these variables in the resultant polymer product.

Apparatus which is a modification of ASTM method and apparatus has now been proposed in U.S. Patent No. 3,048,030 issued August 7, 1962, to Clark G. De Haven which permits the collection and recording of data with a minimum of human attention with satisfactory minimum variation in melt index values on identical material.

This invention represents an improvement over the apparatus described in the De Haven patent.

It is an object of the invention to provide apparatus for measuring melt index of a polymeric material.

Another object of the invention is to provide apparatus for continuously measuring a property of a polymeric material which is a function of polymer melt index.

It is still another object of the invention to provide apparatus for continuously measuring and indicating melt index.

These objects are broadly accomplished by improving the melt index recorder of U.S. Patent No. 3,048,030 by (1) adding a polymer temperature conditioning passage with multiple controlled temperature zones, (2) adding a spring loaded relief mounting system to protect the sensitive pressure transducer, (3) adding a pump overspeed cut out to prevent pressure surges during dry starts, (4) adding a pressure tap in place of the capillary for convenient pressure calibration, (5) adding a potentiometer or other means for adjusting the output from the tachometer to correlate same with standard ASTM melt index determinations, and (6) adding a second potentiometer or means for adjusting the output from the means for indicating melt index to compensate for difference in rate of pump output or a combination of (5) and (6) in series.

In the patent to De Haven, U.S. 3,048,030, apparatus are provided comprising, in series, a source of flowing polymer, positive displacement means for moving said polymer, an orifice and means for measuring pressure up stream of said orifice, calibrated to provide a reading of melt index. In another aspect, the pressure up stream of the orifice is maintained constant by regulating the speed of the positive displacement means, said speed being measured by means calibrated to provide a visual reading of melt index, such as a tachometer. The latter aspect of the invention is the basis for the discussion herein primarily for purposes of simplicity, but the invention is not so limited.

It has been found that if molten polymer is passed through an orifice at a predetermined temperature and at a constant rate the pressure up stream of the orifice is a function of the polymer melt index. It was further found in the apparatus of U.S. 3,048,030 that when the melt index of the flowing polymer varies a control system may be employed to vary the pump speed and thereby maintain a constant pressure up stream of the orifice. Variations in the motor speed are measured and indicated by a tachometer. For example, when it is desired to read melt index directly from the tachometer, the instrument is calibrated so that the ASTM melt index is a linear function of pump speed at a particular temperature and pressure. For example, at a temperature of 380° F. a constant upstream orifice pressure of 43.25 p.s.i. corresponds to the pressure which is placed on the polymer by the piston in carrying out melt index measurements in accordance with ASTM D–1238–57T.

Figure 2:
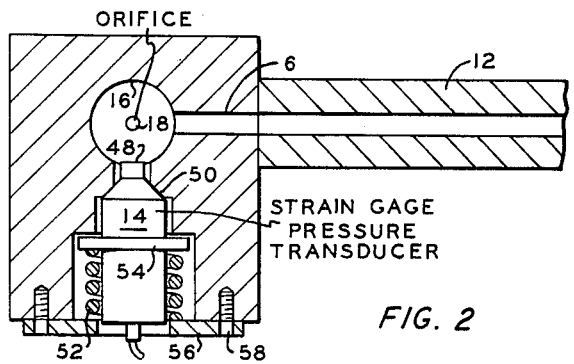
Figure 3:
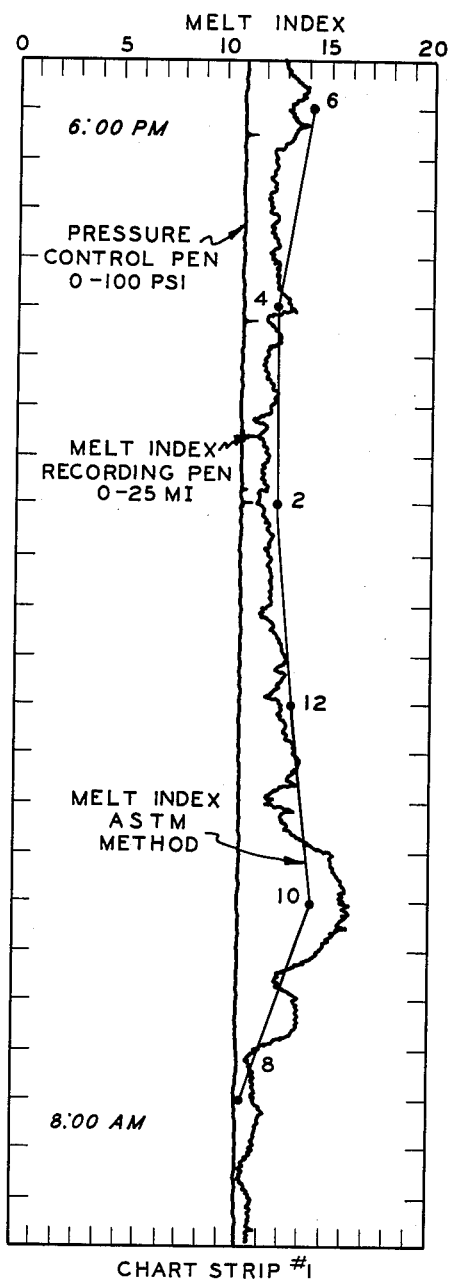

The invention is best described with reference to the accompanying drawings wherein FIGURE 1 is a schematic representation of a suitable embodiment of the invention, FIGURE 2 is a top view in section of the pressure transducer, and FIGURE 3 is pictorial representation of a chart prepared in accordance with the invention with manually determined data also indicated.

The melt index recorder of the invention is preferably directly attached to the stranding die of a production extruder. A small side stream is removed from the stranding die to provide a sample of the polymer melt so as to be able to almost immediately predict the ASTM melt index of pellets produced by the line. The melt index recorder employs a capillary tube which is geometrically similar to the ASTM capillary and it operates under temperature and pressure conditions which are as nearly identical as possible to the ASTM conditions.

Although the invention is described herein with reference to the determination of melt index or melt flow of polyethylene or polypropylene respectively the invention should not be so limited but is broadly applicable to the determination of rheological properties of a polymeric material. For example, the orifice size, cross section and length can be changed as well as the pressure applied on the polymer forced through the capillary so as to provide a broad range of conditions. The polymer melt at die temperature of approximately 450° F. is forced from the stranding die 2 to the metering gear pump 4 through passageway 6 by die pressure and is then pumped by this metering pump through passageway 11 at a rate directly proportional to the r.p.m. of the pump. The pump is driven by a motor 10 and gear reducer 8. From the pump the molten polymer flows through passageway 11 where temperature is accurately controlled. Residence time of the polymer in this flow passage is sufficient to bring it to the desired temperature of 190° C. The polymer then flows into a cavity 16 in communication with the pressure transducer 14 and then through the orifice 18. The pressure in the cavity above the capillary is controlled at 43.25 p.s.i. by controlling the speed of the metering gear pump 4. This is accomplished by feeding the signal from the pressure transducer 14 to a recorder controller 32 by means of power from power supply source 28 and a transmitter 30. The output signal of the melt index recorder controller 32 is sent through speed monitor 41 and then by means of a transmitter 42 to a pneumatic positioner 44 to adjust the speed of the motor 10 by means of a speed controller 46. The output of a tachometer 34 on the metering gear pump 4 is calibrated to be proportional to the flow rate through the orifice in grams per 10 minutes. An adjustable multiplier coefficient is provided so that the value recorded by recorder controller 32 may be made numerically equal to the laboratory determined ASTM melt index. This information is sent from the tachometer 34 through calibration potentiometers 36 and 38, hereinafter described, transmitter 40 and to melt index recorder controller 32.

The strain gauge pressure transducer 14 is a critical element in the pressure control system. A CEC type 4160-150 p.s.i.g. high temperature transducer is suitable and is employed directly in contact with the plastic melt and covered with insulation to minimize the effects of drift in calibration due to temperature changes. The transducer is preferably spring loaded in its mounting to provide over-pressure protection. During warm-up the melting polymer in the passageways can exert high pressure as it expands and can rupture the transducer diaphragm. In other words when the melt index recorder is turned off and no polymer is passing through the passageways the polymer shrinks thereby permitting the entrapment of air. When the polymer is again warmed up during start-up the air can exert tremendous pressures on the sensitive diaphragm 48 of the pressure transducer 14. This embodiment is best illustrated by FIGURE 2 which shows a top view of the pressure transducer section along with orifice 18 and cavity 16. A spring 52 or other means for urging the transducer to provide a firm seat 50 is provided. This spring is preferably a coil spring with sufficient force to react against flange 56 and flange 54 to closely seat the transducer on surface 50. When the pressure exerted within the cavity 16 approaches the value which would normally be damaging to the diaphragm 48 the spring 52 permits the movement of the transducer so as to permit flow of the polymer past the surface 50 thus preventing damage to the diaphragm.

The pressure control system is preferably calibrated by using a regulator and test gauge mounted so as to provide a reference pressure. This pressure is connected to the system in place of orifice 18 and places the test pressure on the transducer while it is at operating temperature. The pressure can be read out directly on the recorder controller 32 thereby checking the calibration of the entire pressure system. The adjustable range transimtter 30 is used to adjust the calibration for the 0 to 100 p.s.i. scale on the recorder chart.

It is an important feature of the invention that temperature control at minimum variations, for example, 190±2° C. is achieved by the employment of multiple zones of temperature control, for example 3 zones of temperature control by careful insulating and by permitting the polymer to have sufficient residence time in the flow passages. A suitably designed temperature controller, such as Model No. 301 by Acromag Inc., Detroit, Michigan, with a thermistor sensing element is employed in each zone.

Multiple temperature control zones are employed to minimize the effect of variation of the temperature of polymer entering the system from the stranding die. It is assumed that the stranding die temperature would be determined by processing requirements. The first temperature controller zone includes the section around the metering pump. This zone necessarily has large temperature variation since it connects directly to the die adaptor. Usual operation requires it to cool the polymer; therefore, it is poorly insulated so the cooling may be controlled by heat loss. The temperature is sensed by temperature sensing means 23 and the signal transmitted to the three zone temperature controller 20. The second zone is along the flow passageway 11 between the pump 4 and the cavity 16, and the third zone is around the cavity 16, orifice 18 and pressure transducer 14. Band heaters around a large aluminum mass and 1½ inch of glass wool insulation minimize temperature and heat losses in these zones and provides very adequate temperature control. The temperature from the second zone is sensed by a temperature sensing means 24 and in third zone by temperature sensing means 26. These signals are transmitted to the 3 zone temperature controller 20 which controls heaters for each zone (not shown).

An overspeed cut-off is also provided to return the speed to 0 if the gear pump speed reaches a predetermined undesirably high value and to restart them from 0 on control after a preset time in delay. This overspeed cut-off feature is necessary to prevent the gear pump from running at undesirably high speeds and refilling the passages with polymer after a shutdown. This could result in damage to the pressure transducer 14 since the controller is not able to respond fast enough to prevent a rapid rise in pressure as the cavity 16 fills with polymer. A Minneapolis-Honeywell Electric Tel-O-Set Monitor Switch, Model No. 33400 is used as the overspeed cut-off device (reference numeral 41).

The ASTM melt index value predicted is correlated to the speed of the gear pump and the melt index recorder in the following manner.

ASTM Melt Index $= K(\text{r.p.m.})(\text{gm.}/10 \text{ rev.})(D^{ASTM}/D^{MIR})^3$ The factor involving the ratio of diameter of the ASTM orifice to the diameter of the melt index recorder orifice theoretically accounts for the difference in flow rates through two similar capillaries of different diameter. The larger capillary was used for the melt index recorder so that residence time in the flow passage would not be excessive. The factor of (gm./10 rev.) is measured for the particular metering pump at operating conditions and is set on a calibrated 10 turn potentiometer 36 which is in the tachometer circuit. The use of this potentiometer permits exact compensation for the weight rate of polymer metered by the gear pump. This factor was found by experience to be substantially constant for all operating conditions.

The r.p.m. factor in the physical system is the output voltage of the gear pump tachometer which is linearly proportional to r.p.m. The factor K is an arbitrary factor set on a calibrated 10 turn potentiometer 38 in the tachometer circuit. This factor makes it possible to compensate for piston friction in the ASTM apparatus for difference in the melt index drop-off of the polymer due to differences in the thermal treatment of the polymer during the two measurements and for other unknown differences.

The melt index recorder calibration is made by using the adjustable range transmitter 40 to make the melt index recorder pen read calculated values of ASTM melt index for appropriate measurement values of r.p.m. with the arbitrary scale factor potentiometer 38 set on 1.000. The K factor is then determined by experience in comparing the recorder melt index to laboratory determined ASTM melt index and is set to make the two numerically equal. This means of calibration permits rechecking the machine calibration at intervals to detect any drift and at the same time permits direct read-out in ASTM melt index. Operating experinece has indicated that the arbitrary scale factor required to predict ASTM melt index is substantially constant for a given polymer but that a different polymer requires a change in scale factors. This change would presumably be brought about by the differences of melt index drop-off characteristics of the different polymers which was accentuated in the visbreaking operation since the polymers are processed without any antioxidants.

In a specific embodiment a visbroken homopolymer of ethylene having a high load melt index of 1 to 1.5 is visbroken in an extruder to a melt index of 10 to 15, at a rate of 600 pounds per hour through the stranding die 2. Melt index is determined periodically by laboratory determinations and continuously by the apparatus of this invention. The comparison of the results is shown in FIGURE 3. It is obvious from these determinations that the results compare very well with the laboratory determinations and indeed compensate for the fact that the laboratory determinations are based on a single analysis.

It is to be understood that no undue limitations or restrictions are to be drawn by reason of the specific examples provided and that many variations and modifications are within the scope of the invention.

Thus, it is within the scope of the invention to employ positive displacement pumping means other than a gear pump, for example a progressing cavity type pump. Also, it is within the scope of the invention to use suitable instrumentation to provide both a visual reading and a continous recording of melt index. The invention is broadly applicable to thermoplastic materials particularly normally solid polymers and copolymers of 1-olefins such as described in U.S. 2,825,721. Particularly preferred are homopolymers and copolymers of ethylene, propylene, butene-1 and the like.

I claim:

1. Apparatus comprising, in combination, a source of flowing polymer discharging into a conduit, a positive displacement pump for moving said polymer through said conduit, said pump being adapted to provide a heat loss, flow restriction means in said conduit downstream from said pump, a first temperature sensing means in communication with the interior of said pump, first heat exchange means disposed so as to adjust the temperature of the interior of said pump, at least one second temperature sensing means in communication with the interior of said conduit, at least one second heat exchange means disposed with respect to said conduit so as to adjust the temperature of the interior of said conduit, at least one temperature control means operably connected to each of said first and second temperature sensing means and each of said first and second heat exchange means to regulate each of said first and second heat exchange means responsive to the output of the corresponding temperature sensing means to maintain said pump and said conduit at a substantially constant temperature, pressure sensing means disposed in said conduit upstream of said flow restriction means and means for indicating the pressure of the flowing polymer calibrated to read in melt index operably connected to said pressure sensing means.

2. The apparatus of claim 1 wherein said pressure sensing means comprises a pressure transducer in communication with the interior of said conduit cooperating with urging means to permit movement and subsequent pressure relief on the pressure sensing portion of said transducer before the pressure exceeds the value normally harmful to said portion.

3. The apparatus of claim 1 wherein means are provided for shutting off the driving means to said pump when the speed thereof exceeds a predetermined value.

4. The apparatus of claim 1 wherein means are provided for adjusting the output of said means for indicating pressure to correlate same with a standard ASTM melt index determination.

5. The apparatus of claim 1 wherein means are provided for adjusting the output from said means for indicating pressure to compensate for differences in weight rate of pump output.

6. Apparatus comprising, in combination, a source of flowing polymer discharging into a conduit, a positive displacement pump for moving said polymer through said conduit, said pump being adapted to provide a heat loss, driving means for said pump, flow restriction means in said conduit down stream from said pump, a first temperature sensing means in communication with the interior of said pump, a first heat exchange means disposed so as to adjust the temperature of the interior of said pump, a second temperature sensing means in communication with the conduit intermediate said pump and said restriction means, a second heat exchange means disposed so as to adjust the temperature of the conduit intermediate said pump and said restriction means, a third temperature sensing means in communication with the conduit adjacent said restriction means, a third heat exchange means disposed so as to adjust the temperature of the conduit adjacent said restriction means, at least one temperature control means operably connected to each of said temperature sensing means and each of said heat exchange means for maintaining said conduit at a substantially constant temperature, a pressure sensing means disposed in said conduit upstream of said flow restriction means and means for indicating the pressure of the flowing polymer calibrated to read in melt index operably connected with said pressure sensing means.

7. Apparatus comprising, in combination, a source of flowing polymer discharging into a conduit, a positive displacement pump for moving said polymer through said conduit, said pump being adapted to provide a heat loss, driving means for said pump, flow restriction means in said conduit downstream from said pump, a first temperature sensing means in communication with the interior of said pump, a first heat exchange means disposed to adjust the temperature of the interior of said pump, a second temperature sensing means in communication with the conduit intermediate said pump and said restriction means, a second heat exchange means disposed so as to adjust the temperature of the conduit intermediate said pump and said restriction means, a third temperature sensing means in communication with the conduit adjacent said restriction means, a third heat exchange means disposed so as to adjust the temperature of the conduit adjacent said restriction means, at least one temperature control means operably connected to each of said temperature sensing means and each of said heat exchange means for maintaining said conduit at a substantially constant temperature, pressure sensing means disposed in said conduit upstream from said flow restriction means, means for varying the speed of the driving means of said pump, a pressure controller operably connected to said pressure sensing means and said means for varying the speed of said driving means so as to control the polymer flow rate through said positive displacement pump to provide a constant pressure in the flowing stream, and a tachometer operably connected to said driving means for indicating the rate of flow of polymer through said positive displacement pump, said tachometer being calibrated to read in melt index.

8. Apparatus comprising, in combination, a source of flowing polymer discharging into a conduit, a positive displacement pump for moving said polymer through said conduit, said pump being adapted to provide a heat loss, driving means for said pump, flow restriction means in said conduit downstream from said pump, means provided for shunting off the driving means to said pump when the speed thereof attains a predetermined value, flow restriction means in said conduit downstream from said pump, a first temperature sensing means in communication with the interior of said pump, a first heat exchange means disposed so as to adjust the temperature of the interior of said pump, a second temperature sensing means in communication with the conduit intermediate said pump and said restriction means, a second heat exchange means disposed so as to adjust the temperature of the conduit intermediate said pump and said restriction means, a third temperature sensing means in communication with the conduit adjacent said restriction means, a third heat exchange means disposed so as to adjust the temperature of the conduit adjacent said restriction means, at least one temperature control means operably connected to each of said temperature sensing means and each of said heat exchange means for maintaining said conduit at a substantially constant temperature, a pressure sensing means disposed in said conduit upstream from said flow restriction means, means for varying the speed of the driving means of said pump, a pressure controller operably connected to said pressure sensing means and said means for varying the speed of said driving means so as to control the polymer flow rate through said positive displacement pump to provide a constant pressure in the flowing stream, a tachometer operably connected to said driving means for indicating the rate of flow of polymer through said positive displacement pump, said tachometer being calibrated to read in melt index, said pressure sensing means comprising a strain gauge pressure transducer in communication with the interior of said conduit and cooperating with urging means to permit movement of the pressure sensing portion of said transducer before the pressure exceeds a value normally harmful to said portion, means for adjusting the output from said tachometer to correlate same with a standard ASTM melt index determination and means for adjusting the output from said tachometer to compensate for differences in weight rate of pump output.

References Cited by the Examiner

UNITED STATES PATENTS 3,048,030   8/1962   DeHaven _____ 73—56

RICHARD C. QUEISSER, *Primary Examiner.*

J. C. GOLDSTEIN, *Assistant Examiner.*